Feb. 4, 1941.  H. S. INDGE  2,230,953
MICROLAPPING MACHINE
Filed July 29, 1939   3 Sheets-Sheet 1
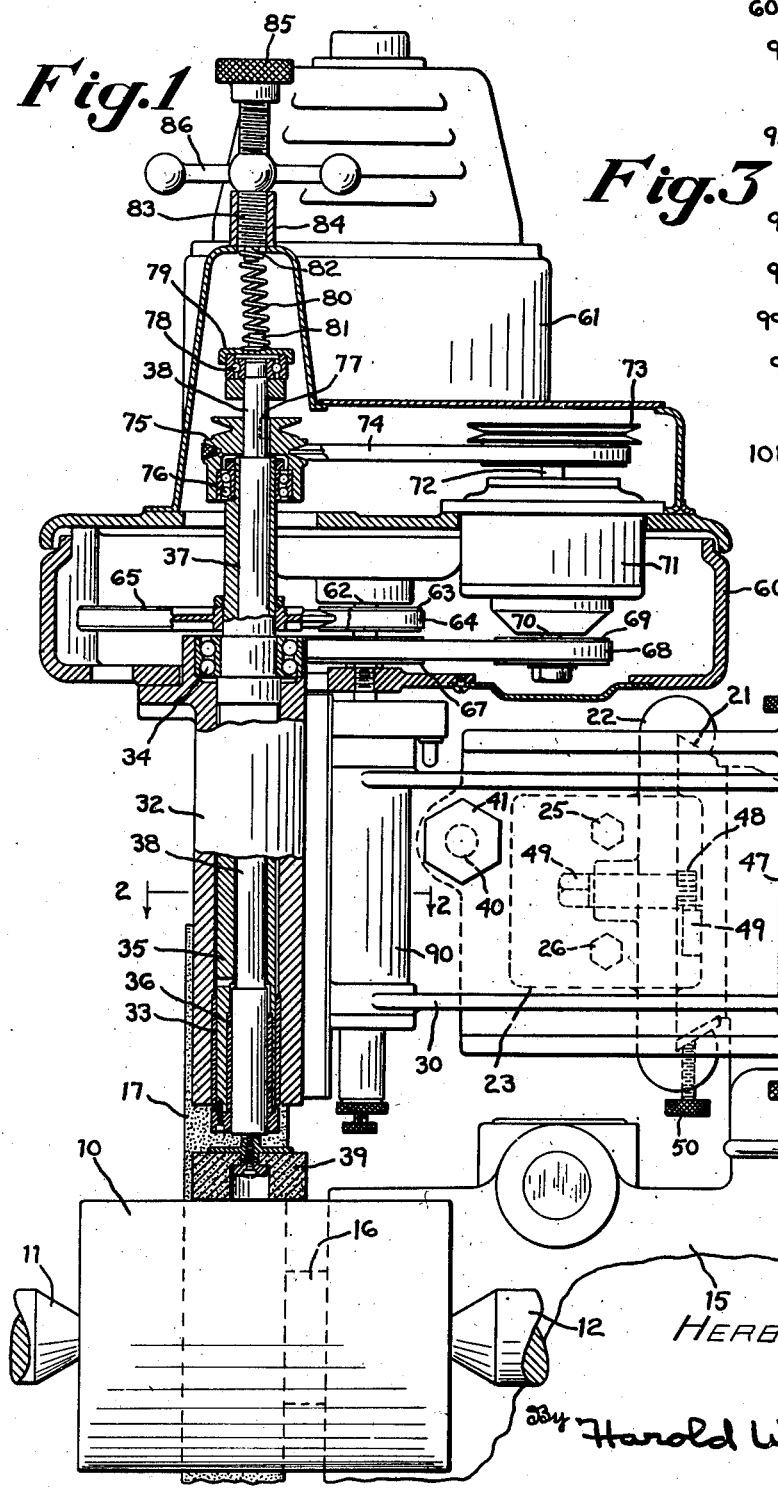
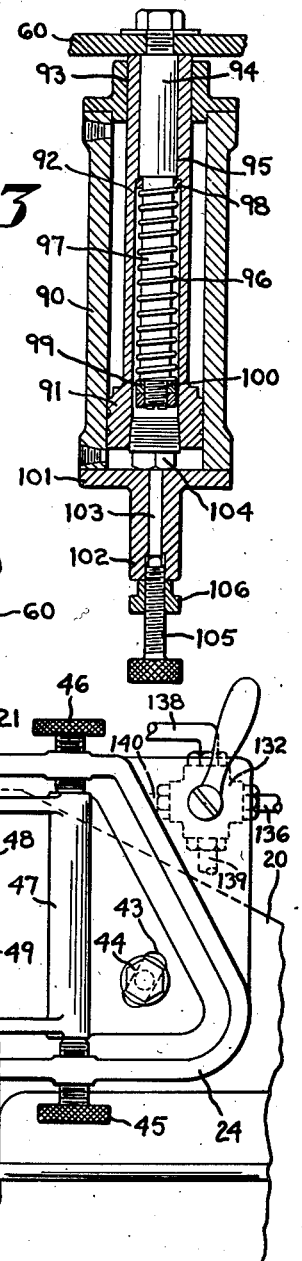
Inventor
HERBERT S. INDGE
By Harold W. Eaton
Attorney Feb. 4, 1941.   H. S. INDGE   2,230,953
MICROLAPPING MACHINE
Filed July 29, 1939   3 Sheets-Sheet 2

Inventor
HERBERT S. INDGE
By Harold W. Eaton
Attorney

Feb. 4, 1941.  H. S. INDGE  2,230,953
MICROLAPPING MACHINE
Filed July 29, 1939    3 Sheets-Sheet 3
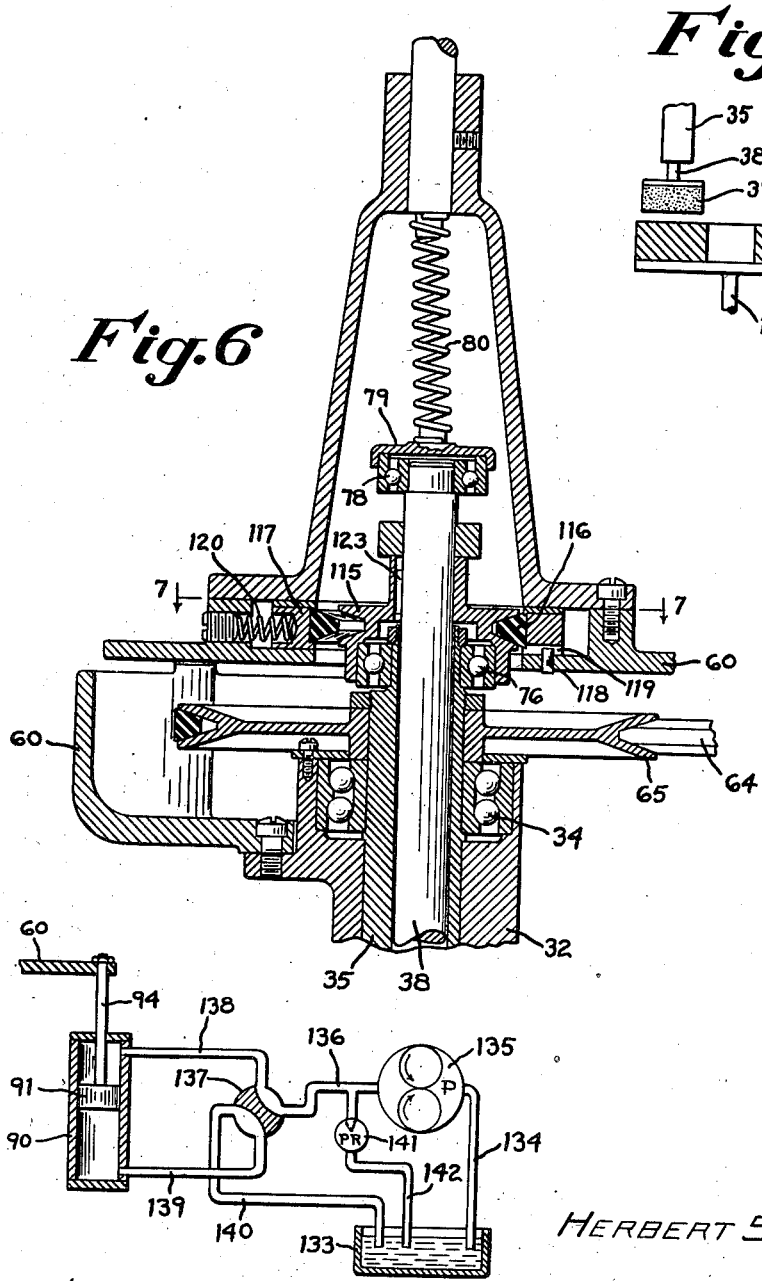
Inventor
HERBERT S. INDGE
By Harold W. Eaton
Attorney Patented Feb. 4, 1941

2,230,953

UNITED STATES PATENT OFFICE 2,230,953

MICROLAPPING MACHINE

Herbert S. Indge, Westboro, Mass., assignor to Norton Company, Worcester, Mass., a corporation of Massachusetts Application July 29, 1939, Serial No. 287,339

8 Claims. (Cl. 51—120)

The invention relates to a microlapping head for a grinding machine, such as a cylindrical or a surface grinding machine.

One object of the invention is to provide a simple and thoroughly practical microlapping head in which either a cylindrical or plane surface of a work piece may be rapidly finished with a surface of extremely high quality. Another object of the invention is to provide a microlapping head which may be utilized as an attachment for a cylindrical grinding machine wherein a cylindrical work piece may be first ground and then microlapped after the grinding operation has been completed. Another object of the invention is to provide a microlapping head for cylindrical or plane surface work pieces in which an end flat face of an abrasive wheel which is rotated slowly and revolved rapidly is utilized to microlap the surface of the work piece. A further object of the invention is to provide a microlapping head which is motor driven and in which the motor is drivingly connected to rotate the wheel spindle at a relatively slow speed and to revolve said spindle by means of an eccentric quill or sleeve rotated at a relatively fast speed. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention, Fig. 1 is a front elevation having parts broken away and shown in section, of the microlapping head shown as applied to a cylindrical grinding machine;

Fig. 3 is a fragmentary vertical sectional view taken approximately on the line 3—3 of Fig. 2, showing the hydraulic piston and cylinder mechanism for positioning the microlapping head;

Fig. 6 is a fragmentary vertical sectional view of a modified construction, showing a second modification of the wheel spindle driving or actuating mechanism;

Fig. 8 is a diagrammatic view showing the application of the microlapping head to a machine for producing a plane surface; and Fig. 9 is a diagrammatic view of the fluid pressure control mechanism for moving the head to and from an operative position.

Figure 4:
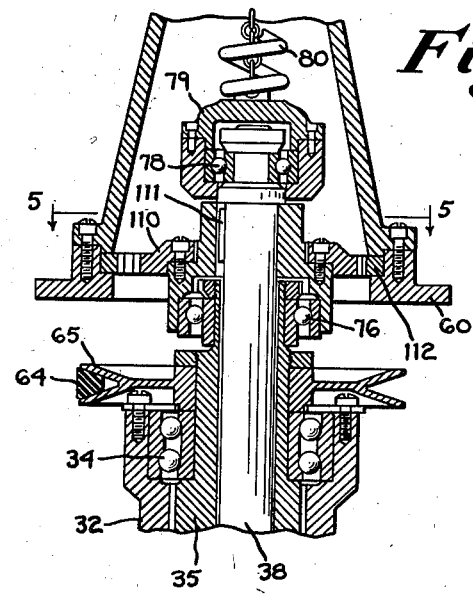
Fig. 4 is a fragmentary vertical section, on an enlarged scale, of a modified construction, showing a modification of the drive for the wheel spindle.
Figure 5:
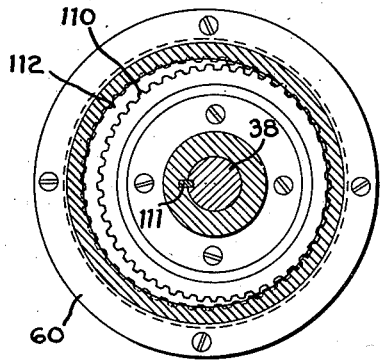
Fig. 5 is a fragmentary cross sectional view taken approximately on the line 5—5 of Fig. 4.

The improved microlapping head has been illustrated as applied to a cylindrical grinding machine of the type shown in the prior U. S. Patent No. 2,071,677 to Wallace H. Wood dated February 23, 1937. This patent above referred to shows a common hydraulically operated cylindrical type grinding machine having a base, a longitudinally movable work table slidably mounted thereon which serves as a rotatable support for a work piece and is also provided with a transversely movable wheel slide which supports a rotatable grinding wheel which is movable transversely toward and from the work support to grind a work piece to the required size. All of these elements, being common, well known parts of a standard cylindrical grinding machine, have not been illustrated in the present case since they are not considered to be a part of the present invention.

As illustrated in the drawings, a rotatable work piece 10 is suported on a headstock center 11 and a footstock center 12. The centers 11 and 12 are in turn respectively supported by a headstock and a footstock (not shown) each of which is in turn mounted on a longitudinally traversable work supporting table (not shown). A transversely movable grinding wheel slide 15 rotatably supports a grinding wheel spindle 16 which serves as a support for a grinding wheel 17.

The work piece 10 is mounted on centers and is rotated by the usual headstock drive (not shown) and is traversed longitudinally by imparting a longitudinal tranversing or reciprocating movement to the table (not shown) in the usual manner while the grinding wheel 17 and its suporting slide 15 are moved transversely toward the work piece 10 to grind the work piece 10 to the required and predetermined size.

In order to produce a highly refined surface on the work piece 10, a microlapping head is provided whereby the peripheral surface of the work piece 10 may be micro-finished after a grinding operation has been completed and without removing the work piece from the machine.

The microlapping head is preferably supported in fixed relationship with the grinding wheel 17 and in the preferred construction is supported on the wheel slide 15. A bracket 20 is fixedly mounted on the upper surface of the wheel slide 15. The bracket 20 is provided with a dovetailed slideway 21 (Fig. 1) which serves as a support for a horizontally movable slide 22. The slide 22 is also provided with a dovetailed way which mates with the way 21. The forward end of the slide 22 is provided with a rectangularly shaped end surface 23 which serves as a support for a bracket 24. The bracket 24 is rigidly secured thereto by means of bolts 25 and 26.

Figure 2:
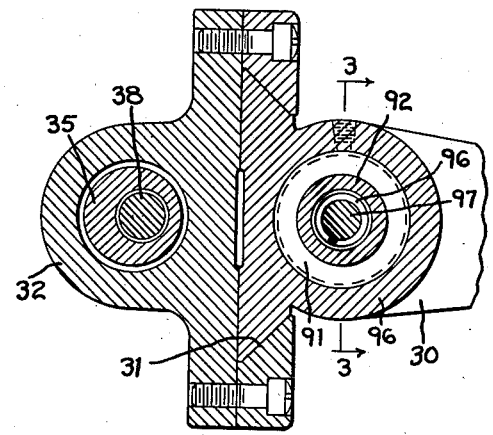
Fig. 2 is a cross sectional view, on an enlarged scale, taken approximately on the line 2—2 of Fig. 1, showing the supporting slide for the lapping head and the cylinder and piston for moving the head to and from an operating position.

The bracket 24 serves as a support for an adjustably mounted frame 30. The frame 30 is provided with a vertically arranged dovetailed slideway 31 which serves as a support for a vertically slidable microlapping head 32. The head 32 is provided with a dovetailed slideway which mates with the slideway 31 (Fig. 2).

The microlapping head 32 is provided with bearings 33 and 34 which serve as a support for a rotatable hollow sleeve 35. The sleeve 35 is provided with eccentrically mounted bearings 36 and 37 within its central aperture which serve as a rotatable support for a rotatable wheel spindle 38. The wheel spindle 38 is provided at its lower end with a bonded abrasive lapping wheel 39 which is arranged to present an end flat face for micro-lapping or finishing the work piece 10.

It is desirable that the axis of the wheel spindle 38 be adjustable so that it may be positioned so that the diametrically opposite sides of the wheel 39 bear uniformly upon the surface to be lapped. In the preferred construction the frame 30 is pivotally mounted on the bracket 24. A stud 40 having an enlarged head 41 passes through a hole in the frame 30 and is screw threaded into the bracket 24. The other end of the frame 30 is provided with an arcuate shaped elongated slot 42 through which a clamping bolt 44 passes. The bolt 44 passes through the elongated slot 43 and is screw threaded into the bracket 24. To facilitate adjustment of the frame 30, a pair of opposed adjusting screws 45 and 46 are screw threaded into the upper and lower portions of the bracket 24. The adjusting screws 45 and 46 are arranged to engage an enlarged end portion 47 of the frame 30. By slacking-off on the clamping screw 44 and then adjusting the screws 45 and 46 as push and pull screws, the frame 30 may be adjusted about its supporting pivot 40 to position the axis of the grinding wheel spindle 38 as desired. After the spindle 38 has been adjusted into the desired operating position, the clamping screw 44 may then be locked to clamp the frame 30 fixedly to the bracket 24 to maintain the spindle 38 and its supporting parts in the desired operating position.

In the preferred construction, the transversely movable horizontal slide 22 serves to adjust the position of the microlapping head transversely so that the axis of the rotatable sleeve 35 may be positioned relative to the work axis as desired. To facilitate transverse adjustment of the slide 21, a pinion 48 is formed at the end of a stud 49 which is in turn rotatably supported by the slide 22. The pinion 48 meshes with a rack bar 49 which is fixedly mounted on the bracket 20. The slide 22 may be locked in adjusted position by means of clamping screws 50 which lock the slide 22 in adjusted position on the dovetailed slideway 21 of the bracket 20.

In order to produce a highly refined or microlapped finish on a work piece (either cylindrical or flat), it is desirable to provide a slow rotary movement and a rapid planetary or oscillating movement of the lapping wheel 39 so that any grain markings or irregularities or scratches produced by the grinding operation will be removed during the micro-lapping or finished operation. A driving mechanism is provided to produce the desired rotary and planetary movement of the lapping wheel 39. An enlarged casing 60 is fixedly mounted on the upper portion of the vertically movable head 32. An electric motor 61 is supported by the casing 60 with its shaft 62 extending in a substantially vertical direction. The motor shaft 62 is provided with a V-grooved pulley 63 which is connected by means of a V-belt 64 with a V-grooved pulley 65 which is mounted on the outer peripheral surface of the sleeve 35. The pulley 63 is of relatively small diameter and the pulley 65 of relatively large diameter, so that the sleeve 35 is rotated at a slower speed than the motor shaft 62 but at a comparatively fast rate of speed to produce a comparatively fast planetary movement of the wheel 39.

The motor 61 is also arranged to drivingly rotate the wheel spindle 38. A pulley 67 is also mounted on the motor shaft 62. This pulley 67 is also a V-grooved pulley which is connected by means of a V-belt 68 with a pulley 69. The pulley 69 is mounted on the driving shaft 70 of a speed reduction unit 71. The speed reduction unit 71 may be any standard speed reducing unit, such as are common, well known devices in the machine tool art. In the preferred construction, the unit illustrated is known to the trade as the Heliocentric speed reducing unit, manufactured by Universal Gear Corporation, Indianapolis, Indiana. The speed reducing unit 71 is provided with a driven shaft 72 on which is mounted a multi-step V-grooved pulley 73 which is drivingly connected by means of a V-belt 74 with a multi-step V-grooved pulley 75. The V-grooved pulley 75 is rotatably supported by an anti-friction bearing 76 which is mounted on a reduced portion of the sleeve 35 which is concentric with the axis of the wheel spindle 38. The pulley 75 is slidably keyed by means of a key 77 to the wheel spindle 38. By utilizing this bearing construction for supporting the driving pulley for the spindle 38, the spindle is free for an endwise adjustment or movement in an axial direction. By means of the speed reduction unit 71, the motor 61 which drives the sleeve 35 at a relatively rapid speed, rotates the wheel spindle 38 at a comparatively slow speed so that the abrasive wheel or microlapping wheel 39 is caused to rotate at a relatively slow speed while it is moved in a planetary or orbital motion at a comparatively rapid rate of speed.

A yieldable adjustable pressure device is provided for regulating the pressure of the wheel 39 while in operative contact with the work 10 to be finished. The upper end of the wheel spindle 38 supports an anti-friction bearing 78 which in turn serves as a support for a cap 79. A compressing spring 80 is interposed between a stud 81 fixedly mounted on the cap 79 and a stud 82 which is fixedly mounted on the lower end of an adjusting screw 83. The adjusting screw 83 is screw threaded into an upwardly projecting housing 84 which is fixedly mounted relative to the casing 60. The screw 83 is provided with an actuating knob 85 and also with a locking nut 86. By manipulation of the locking nut 86 and the adjusting knob 85, the compression of the spring 80 may be varied as desired to provide the desired operating pressure on the spindle 38 to maintain the microlapping wheel 39 in operative engagement with the work piece 10 at the desired pressure.

To facilitate moving the microlapping head to and from an operative position, a hydraulic lift is provided comprising a hydraulic cylinder 90 which is preferably formed integral with the microlapping head frame 30. A piston 91 is slidably mounted within the cylinder 90. It is desirable to provide a yieldable connection between the frame 30 and the piston 91 so that in case any obstruction is in the path of the wheel 39, the parts will yield and prevent misalignment or breakage of the parts. A piston 91 is provided with an integral sleeve 92 which is slidably mounted in an aperture 93 formed in the upper head of the cylinder 90. A rod 94 is fixedly attached to the frame 60 at its upper end and is slidably mounted within an aperture 95 in the sleeve 92. A compression spring 96 surrounds the lower reduced end portion 97 of the rod 94 and is interposed between a collar 98 within the sleeve 92 and a collar 99 which is screw threaded onto the reduced screw threaded end 100 of the rod 94. It will be readily apparent from the foregoing disclosure that if any obstruction occurs in the path of the housing or casing 60 on its downward movement, the spring 96 will be compressed and thus prevent the fluid pressure from being directly applied to spring the parts or break the same. The spring 96 also serves, as above described, as a yieldable member in case there happens to be any obstruction in the path of the microlapping wheel 39.

It is desirable to provide a positive stop to limit the downward movement of the lapping or finishing head 32. This is preferably accomplished by providing a stop to limit the downward movement of the piston 91. The lower cylinder head 101 is provided with a downwardly extending boss 102 which serves as a support for a slidably mounted stop rod 103, the upper end of which is arranged to engage the lower surface of a plug 104 which is screw threaded into and fixedly mounted relative to the piston 91. An adjusting screw 105 is screw threaded into the aperture within the boss 102 and serves to facilitate adjustment of the stop rod 103 as desired. A lock nut 106 is provided so that the stop screw 105 may be locked in a predetermined adjusted position. In the position of the parts as illustrated in Fig. 3, the stop rod 103 is shown as positioned in its extreme downward position with the plug 104 of the piston 91 engaging not only the end of the stop rod 103 but also the end face of the cylinder cap 101. If it is desired to stop the wheel 39 before it reaches this position, the adjusting screw 105 may be readily turned to raise the stop rod 103 to limit the position of the piston 91 so as to position the wheel 39 as desired for a finishing operation.

A modified driving mechanism has been illustrated in Fig. 4 for controlling the rotation of the wheel spindle 38. Instead of having a positive driving mechanism therefor, a creeping action is obtained by mounting a gear 110 to rotate on the anti-friction bearing 76. The gear 110 is keyed to the spindle 38 by means of a key 111. The gear 110 is arranged to mesh with a stationary internal gear 112 which is supported by and fixedly mounted relative to the frame 60. The internal gear 112 is of the proper size to allow the gear 110 to be revolved with the sleeve 35 so that it is in continuous mesh with a portion of the gear 112 as the sleeve 35 rotates. The gear 110 is preferably formed with fewer teeth than the ring or internal gear 112 so that as the sleeve 35 revolves the spindle 38, the gear 110 rolling within the internal gear 111 causes the spindle to creep or rotate at a very slow speed relative thereto. This relative speed may be increased by changing the ratio of the gear teeth formed on the gear 110 and the ring or internal gear 112. This construction facilitates a rapid planetary motion of the microlapping or abrading wheel 39 while at the same time producing a very slow relative rotation thereof.

Figure 7:
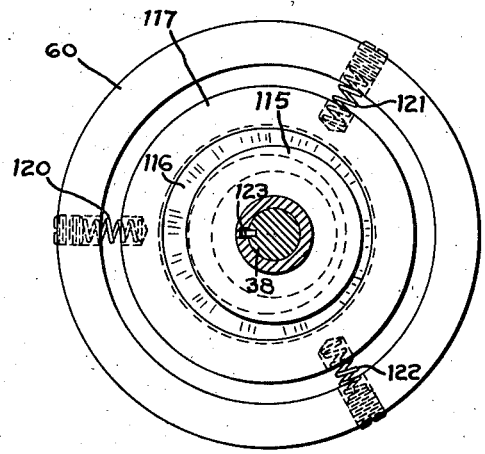
Fig. 7 is a fragmentary cross sectional view taken approximately on the line 7—7 of Fig. 6.

A still further modification of the spindle driving means has been illustrated in Figs. 6 and 7. A V-grooved pulley 115 is rotatably supported on the anti-friction bearing 76. A collar or ring 116 of V-shaped cross sectional area which is preferably formed of a material such as commonly used in the construction of V-belts is mounted on the inner peripheral surface of an annular ring 117. The collar 116 is arranged to drivingly engage the V-groove of the pulley 115 on one side of its peripheral surface. The collar or ring 116 is preferably of a diameter to facilitate a planetary movement of the pulley 115 as the sleeve 35 is revolved. The revolving of the pulley 115 while in engagement with the annular V-shaped ring 116 causes a frictional rotation at a very slow speed of the wheel spindle 38 so that the wheel 39 is rotated at a very slow rate of speed while it is moved in a planetary or orbital path at a comparatively fast speed. The annular ring 117 which supports the driving ring 116 is preferably free to float within the housing 60 and is held against rotation by means of a stud 118 which engages a slot 119 formed in the under face of the ring 117. Spaced symmetrically arranged springs 120, 121 and 122 are provided normally to hold the ring 117 in a central position but are arranged to allow the ring 117 to move laterally so as to produce the desired frictional driving contact between the non-rotatable ring 117 and the pulley 115 as the sleeve 35 is rotated. The pulley 115 is keyed to the spindle 38 by means of a key 123 so that as the pulley 115 is rotated by being frictionally revolved in contact with the friction driving ring 116, a slow rotary movement will be imparted to the spindle 38. This drive facilitates a very slow rotation of the spindle 38 and the microlapping or abrading wheel 39 while it is being simultaneously moved in a planetary or orbital path at a comparatively rapid rate of speed.

While the microlapping head shown in Fig. 1 has been illustrated as applicable to a plain cylindrical type grinding machine, this type of head is equally applicable to a machine for producing a plane surface such as, for example, either a rotary or reciprocatory type surfacing machine. A rotary type machine has been diagrammatically illustrated in Fig. 8, in which the rotary and planetarily moved microlapping or finishing wheel 39 is rotated and revolved in operative contact with a work piece 130 having a plane surface to be finished. The work piece 130 is mounted, as illustrated, on a work supporting platen 131 which is supported and rotated by means of a spindle 132. The lapping or microfinishing head is likewise equally applicable to the plane surface type machine in which a work piece having a plane surface to be finished is mounted upon a reciprocatory work table.

A fluid pressure system has been provided for controlling the admission of fluid to the cylinder 90. This fluid pressure system has been illustrated diagrammatically in Fig. 9 and includes a fluid reservoir 133 which is preferably located within the base of the machine. Fluid is pumped from the reservoir 133 through a pipe 134 by means of a motor driven fluid pump 135 which forces fluid through a pipe 136 to a manually operable four-way valve 137. In the position of the parts as illustrated in Fig. 9, fluid under pressure passing through the pipe 136 and valve 137 passes through the pipe 138 to the cylinder chamber above the piston 91 to cause a downward movement of the piston to shift the microlapping head 32 downwardly to move the wheel 39 into operative engagement with the work piece 10. During this movement, fluid within the cylinder chamber below the piston 91 exhausts through a pipe 139, the valve 137, and out through a pipe 140 into the reservoir 133. Similarly, when the rotor of the four-way valve 137 is turned one-quarter turn, fluid under pressure from the pipe 136 passes through the pipe 139 to the lower cylinder chamber to cause an upward movement of the piston 91 and the microlapping head 32 to move it to an inoperative position. During this movement fluid within the upper cylinder chamber exhausts through the pipe 138 and out through the valve 137 and pipe 140 into the reservoir 133.

The operation of the finishing head will be readily apparent from the foregoing disclosure. Assuming the parts have been previously adjusted, the work piece is first ground by means of the rapidly rotating grinding wheel 17 by the usual cylindrical grinding operation, after which the grinding wheel 17 and its supporting slide 15 are moved rearwardly to an inoperative position. The electric motor 61 is then started and when the grinding wheel 17 is in its rearward position, the four-way valve 137 is shifted to admit fluid under pressure from the pump 36, through the pipe 136, the valve 137 and the pipe 138 to cause the piston 91 and the microlapping head 32 to move downwardly into an operative position with the lapping wheel 39 in operative engagement with the peripheral surface of the work piece 10. The lapping wheel 35 is rotated slowly while it is revolved rapidly and the work piece is rotated and reciprocated until the work piece has been lapped to the desired and predetermined microfinish, after which the four-way valve is shifted into the reverse position to raise the microlapping head 32 to an inoperative position.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A microfinishing head having a vertical rotatable wheel spindle, an abrasive wheel mounted on said spindle and arranged to present an end flat face for abrading a work piece, a rotatable sleeve surrounding said spindle, eccentric bearings within said sleeve rotatably to support said spindle, an electric motor on said head, driving connections between said motor and said sleeve to rotate the sleeve at a relatively fast speed, and means including driving connections between said motor and spindle to rotate said spindle at a relatively slow speed, said driving connections serving to produce a combined rotary and planetary movement of said operative wheel to produce the desired lapping action.

2. A microlapping head having a vertical rotatable wheel spindle, a lapping wheel mounted on one end of said spindle and arranged to present an end flat face for lapping a work piece, a rotatable sleeve surrounding said spindle, eccentrically arranged bearings in said sleeve to support said spindle with its axis eccentric relative to the axis of said sleeve, means including a single electric motor on said head to impart a relatively fast rotary movement to said sleeve and a relatively slow rotary movement to said spindle to produce a combined planetary and rotary movement of the lapping wheel, means to move said lapping head to and from an operative position, and an adjustable stop to locate the lapping head in a predetermined operative position.

3. A microlapping head having a vertical rotatable wheel spindle, a lapping wheel mounted on one end of said spindle and arranged to present an end flat face for lapping a work piece, a rotatable sleeve surrounding said spindle, eccentrically arranged bearings in said sleeve to support said spindle with its axis eccentric relative to the axis of said sleeve, means including a driving motor on said head to impart a relatively fast rotary movement to said sleeve and a relatively slow rotary movement to said spindle to produce a combined planetary and rotary movement of the lapping wheel, means including a piston and cylinder to move said head to and from an operative position, a control valve therefor, and means including an adjustable stop to limit the movement of said piston so as to locate the head in a predetermined operative position.

4. A microlapping head having a vertical rotatable wheel spindle, a lapping wheel mounted on one end of said spindle and arranged to present an end flat face for lapping a work piece, a rotatable sleeve surrounding said spindle, eccentrically arranged bearings in said sleeve to support said spindle with its axis eccentric relative to the axis of said sleeve, a driving mechanism to impart a relatively fast rotary movement to said sleeve and a relatively slow rotary movement to said spindle to produce a combined planetary and rotary movement of the lapping wheel, means to move said head to and from an operative position, an adjustable stop to limit the movement of said head to locate the head in a predetermined operative position, and yieldable means interposed between the spindle and sleeve to maintain the lapping wheel in engagement with the work piece at the desired and predetermined pressure.

5. A microlapping head having a vertical rotatable wheel spindle, a lapping wheel mounted on one end of said spindle and arranged to present an end flat face for lapping a work piece, a rotatable sleeve surrounding said spindle, eccentrically arranged bearings in said sleeve to support said spindle with its axis eccentric relative to the axis of said sleeve, a driving mechanism to impart a relatively fast rotary movement to said sleeve and a relatively slow rotary movement to said spindle to produce a combined planetary and rotary movement of the lapping wheel, means including a piston and cylinder to move said head to and from an operative position, a stop to limit the movement of said head in one direction so as to locate the head in a predetermined operative position, yieldable means interposed between the spindle and sleeve for maintaining the lapping wheel in engagement with the work piece under pressure, and means to adjust said yieldable means to vary the operative pressure of the lapping wheel on the work piece.

6. A microlapping head having a vertical rotatable wheel spindle, a lapping wheel mounted on one end of said spindle and arranged to present an end flat face for lapping a work piece, a rotatable sleeve surrounding said spindle and arranged to support said spindle with the axis of the spindle eccentric relative to the axis of the sleeve, a motor driven mechanism to impart a relatively fast rotary movement to said sleeve, and a spindle driving mechanism including a member slidably keyed to said spindle, and a frictional driving member surrounding the latter member which is held stationary, said latter part serving during rotation of said sleeve to impart a slow rotary movement to said spindle as it moves in a planetary path.

7. A microlapping head for a grinding machine having a vertical rotary wheel spindle, a lapping wheel mounted on the end of said spindle and arranged to present an end flat face for lapping a work piece, a rotatable sleeve surrounding said spindle and arranged to support said spindle with the axis of the spindle eccentric relative to the axis of the sleeve, a motor driven mechanism to impart a relatively fast rotary movement to said sleeve, a V-grooved pulley slidably keyed to said spindle, and a stationary annular ring of V-shaped cross sectional area surrounding said pulley and arranged to frictionally engage the groove of the pulley during the planetary movement of the wheel spindle when the sleeve is rotated to impart a slow rotary movement to said spindle.

8. A microlapping head for a grinding machine having a vertical rotary wheel spindle, a lapping wheel mounted on the end of said spindle and arranged to present an end flat face for lapping a work piece, a rotatable sleeve surrounding said spindle and arranged to support said spindle with the axis of the spindle eccentric relative to the axis of the sleeve, a motor driven mechanism to impart a relatively fast rotary movement to said sleeve, a gear slidably keyed to said spindle, an annular stationary ring gear surrounding said gear which is arranged so as to impart a slow rotary movement to said spindle when the spindle is moved in a planetary path due to the rapid rotary movement of said sleeve.

HERBERT S. INDGE.